US005252989A

United States Patent [19]

Kawakami et al.

[11] Patent Number: 5,252,989

[45] Date of Patent: Oct. 12, 1993

[54] APPARATUS FOR FORMING A SECONDARY IMAGE ON A PHOTOGRAPHIC PRINTED PAPER

[75] Inventors: Sota Kawakami, Shiroyama; Takahiro Ogawa; Takayuki Sugaiwa, both of Hachioji; Tatsuichi Maehashi, Hino, all of Japan

[73] Assignee: Konica Corporation, Tokyo, Japan

[21] Appl. No.: 703,737

[22] Filed: May 21, 1991

[30] Foreign Application Priority Data

| | | | |
|---|---|---|---|
| May 23, 1990 | [JP] | Japan | 2-132944 |
| May 25, 1990 | [JP] | Japan | 2-138679 |
| May 30, 1990 | [JP] | Japan | 2-141017 |
| May 30, 1990 | [JP] | Japan | 2-141019 |

[51] Int. Cl.[5] .......... G01D 15/10

[52] U.S. Cl. .......... 346/76 PH; 400/120

[58] Field of Search .......... 355/200, 202; 346/23, 346/76 PH; 400/120

[56] References Cited

U.S. PATENT DOCUMENTS

| | | | |
|---|---|---|---|
| 4,244,289 | 1/1981 | Collins | 219/216 X |
| 4,629,312 | 12/1986 | Pearce et al. | 346/76 PH X |
| 4,738,555 | 4/1988 | Nagashima | 400/120 X |

FOREIGN PATENT DOCUMENTS

| | | | |
|---|---|---|---|
| 0258575 | 12/1985 | Japan | 355/202 |
| 0154972 | 7/1986 | Japan . | |
| 0173071 | 7/1988 | Japan | 355/202 |
| 0208870 | 8/1988 | Japan | 355/200 |
| 0253961 | 10/1988 | Japan | 355/202 |
| 0183272 | 7/1990 | Japan | 355/202 |

OTHER PUBLICATIONS

Anderson, et al., "Ultraviolet-Cured Inks for Edge Numbering by the User on Any Motion-Picture Film, Including Polyester", SMPTE Journal, vol. 87, No. 11, Nov. 1978.

European Search Report.

*Primary Examiner*—A. T. Grimley
*Assistant Examiner*—William J. Royer
*Attorney, Agent, or Firm*—Finnegan, Henderson, Farabow, Garrett & Dunner

[57] ABSTRACT

An apparatus for forming additional images such as characters, illustrations and the like freely in any portion on a photographic paper having a primary photographic image is disclosed. The apparatus includes an image edit system and a thermal transfer system. The edit system designates additional image positions on the primary image on the photogrpahic paper, using the inputted primary image data and the inputted additional images data. The thermal transfer system has a thermal ink transfer ribbon and thermal transfer head for transferring the additional images on the photogrpahic paper according to the edit system. In a preferred embodiment, the photographic paper surface is covered with a UV-cured resin layer.

9 Claims, 5 Drawing Sheets

APPARATUS FOR FORMING A SECONDARY IMAGE ON A PHOTOGRAPHIC PRINTED PAPER

BACKGROUND OF THE INVENTION

The present invention relates to an image forming apparatus on a photographic print by which secondary images such as characters, illustrations and the like are freely formed in a primary image portion on a photographic paper.

There is known a photographic print on which a primary image is printed with a negative film, and at the same time a secondary image is printed with a secondary image document film.

For example, when a driver's license or an identification card is made, a portrait and the characters of one's name and address are simultaneously printed and developed. In some cases, a post card is made of a photographic print. In this case, a primary image is printed on a photographic print with a negative film, and at the same time a secondary image is printed with a secondary image document film.

The layout, such as printing position and size, and characters such as an explanation of the photograph, and illustrations of a secondary image, which are to be printed on a photographic print together with a primary image, are optionally designated by a customer.

In order to print the secondary image on a photographic print together with the primary image, it is necessary to make a secondary image document film on which the secondary image is previously formed. This secondary image document film is usually made by the method of computerized phototype-setting.

Since a photographic process is utilized in the aforementioned case in which the secondary image is made by the method of computerized phototype-setting, it is necessary to provide a specific apparatus in order to make a print, and further it is time consuming.

It costs much labor and expense to make an image document mask film previously.

In the case of the photographic printing method described above, the final layout can not be known until printing has been completed, so that the check of the layout is delayed.

Consequently, instead of the photographic printing method, the following method can be considered: for example, after a primary image has been printed on silver-halide light sensitive components of a photographic paper and has been developed, a secondary image is printed on the aforementioned primary image with a printer. In this case, for example a computer is used and the secondary image is inputted into the computer so that the inputted image can be edited. Accordingly, the layout of the secondary image can be previously confirmed, so that mistakes can be easily corrected.

In the aforementioned case, for example in which an electrophotographic printer is used, the secondary image can be directly printed, but it is difficult to transfer the toner image onto a thick paper such as a photographic paper.

In the case in which an impact printer is used, dents are made on a photographic paper and photographic components are damaged so that the formed image is affected.

Further, it is not possible to use an ink-jet printer because the ink bleeds on the surface of the photographic paper and the primary image is damaged since the ink strikes through.

When the photographic print is used as a post card, it is necessary to provide image durability so that the image portion can be protected from stain and damage.

SUMMARY OF THE INVENTION

With a view to solving the aforementioned conventional problems, the present invention has been accomplished. It is a primary object of the present invention to provide an image forming apparatus of a photographic print which is characterized in that: it is not necessary to make a secondary image film previously when the secondary image is to be added to a primary image on a photographic print; the layout of the secondary image can be confirmed beforehand; the confirmed secondary image can be directly formed on the photographic print; and a secondary image of high print quality can be obtained, wherein a time-consuming photographic process is not utilized.

In order to solve the aforementioned problems, the image forming apparatus of a photographic print of the present invention is characterized in that: the primary image is printed on silver halide light sensitive components on a photographic paper and then developed; and a secondary image such as characters, illustrations or the like is thermally transferred onto a predetermined position of the primary image portion on the photographic paper.

The photographic print of the present invention comprises: a photographic image layer carrying a primary image, wherein the silver halide light sensitive components are provided on the support of a photographic paper; and a thermal-transferred image layer by which a secondary image such as a characters and illustrations is formed on a predetermined position of the photographic layer.

According to the present invention, a primary image is previously printed on a photographic paper and developed, and a secondary image is formed on the photographic paper by the method of thermal-transfer. Therefore, when the secondary image is added to the photographic paper, it is not necessary to previously make a film on which the secondary image is formed. Since the secondary image is formed by the method of thermal-transfer, the primary image on the photographic paper is not damaged and a secondary image of high print quality can be added onto the primary image.

The image forming apparatus of a photographic print of the present invention comprises: an image input section which inputs image information from a photographic paper or a negative film in which the image is visualized; a secondary image input section which inputs a secondary image to be added onto the photographic paper; an image memory which stores this secondary image; an image processing section by which the input image sent from the aforementioned image input section and the secondary image read out from the aforementioned image memory are displayed and edited; and a thermal-transfer image forming section which transfers the secondary image onto a visualized photographic paper according to the editing result.

In the aforementioned image forming apparatus, the secondary image to be added onto the photographic paper is inputted from the secondary image input section, and the inputted secondary image is stored in the image memory. The image information of a visualized photographic paper or a negative film is inputted by the image input section. The input image sent from the image input section and the secondary image read out from the image memory are edited in the image processing section. In the editing process, the layout of images is displayed so that it can be checked. Therefore, the images can be correctly edited and the secondary image can be accurately added onto a determined position on the photographic paper.

Since the secondary image edited in the image processing section is transferred onto the visualized photographic paper in the thermal-transfer image forming section, print quality can be improved without damaging the primary image formed on the photographic paper.

In the present invention, a secondary image is formed by the method of thermal-transfer on a primary image portion previously formed on a photographic paper, and further preferably a resin coating layer is laminated on all the images. Therefore, the primary image on the photographic paper and the secondary image added separately from the primary image, are protected by the resin coating layer, so that storage stability is remarkably improved.

In the present invention, the resin coating is conducted in such a manner that: a UV-curable resin layer is previously formed on a support; the UV-curable resin layer on the support is heated so that the resin can be transferred; and the transferred resin layer is illuminated with UV-rays so that it can be hardened.

Since the support is utilized on which a UV-curable resin layer is previously formed and a resin coating layer is formed by the method of thermal-transfer, a uniform resin layer can be easily formed, and further the apparatus is simple and compact. Further, the resin coating layer is laminated on these images, so that the primary image on the photographic paper and the added secondary image are protected by the resin layer and the image durability can be remarkably improved.

The resin coating layer may be formed in such a manner that: a UV-curable resin is coated; and the coated resin layer is illuminated with UV-rays so that it can be hardened.

The apparatus of a photographic print in the manner above-described comprises: a supply section which supplies a photographic paper in which the primary image is printed and developed; a thermal-transfer section which forms a secondary image such as characters and illustrations on a predetermined position of the primary image portion printed on the aforementioned silver halide light sensitive component, by the thermal-transfer method; a coating section which coats UV-curable resin on the primary image and the secondary image; and a UV-ray illuminating section which illuminates the coated UVcurable resin with UV-rays so that the resin can be hardened In the manner described above, the secondary image is added onto the primary image on the photographic paper with a simple apparatus, and the added secondary image is protected by the resin coating layer, so that a photographic print with high durability can be made.

DESCRIPTION OF THE PREFERRED EMBODIMENTS

Referring now to the attached drawings, an embodiment of the present invention will be explained as follows.

Figure 1:
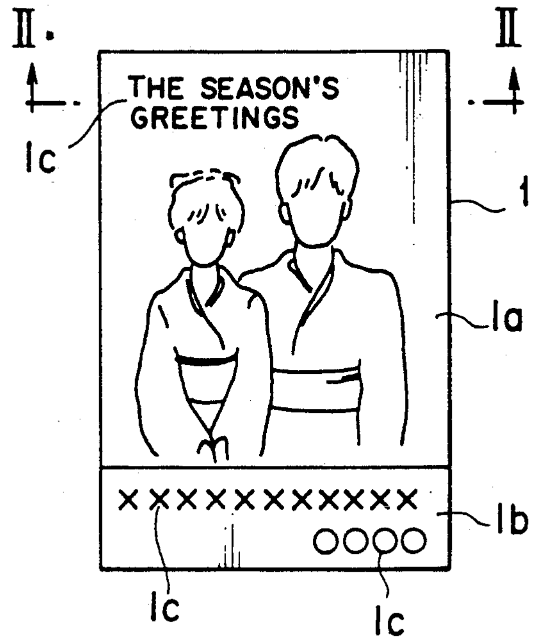
FIG. 1 is a drawing which shows a photographic print.
Figure 2:
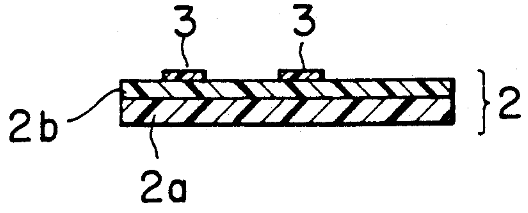
FIG. 2 is a sectional view taken on line II—II in FIG. 1.

The photographic print of the preferred embodiment of the present invention is composed as shown in FIG. 1 and FIG. 2. A primary image is previously printed on the photographic paper 2 comprising a support **2*a* provided thereon silver halide light sensitive components from a negative film with a photographic printer, and after printing, the photographic image is developed. For example, this photographic print 1 was made of Konica Color Paper Type SR, and specifically an image was printed, developed, fixed and stabilized on Konica Color Paper Type SR with NPS-501 made by Konica. The size of the photographic print 1** is not specified. For example, an A4 size, a post card size, a service size and the like are used.

A secondary image **1*c* of a character and a figure are formed by the method of thermal-transfer on a image portion 1*a* and/or a non-image portion 1*b* of the photographic print 1**.

As shown in FIG. 2, the photographic print made in the way described above comprises: a photographic image layer **2*b* in which a primary image is formed; wherein the photographic image layer 2*b* is provided on the support 2*a*; and a thermal-transfer image layer 3 forming secondary image 1*c* is formed, wherein the thermal-transfer image layer 3 is provided on a predetermined position of the photographic image layer 2*b***.

Figure 3:
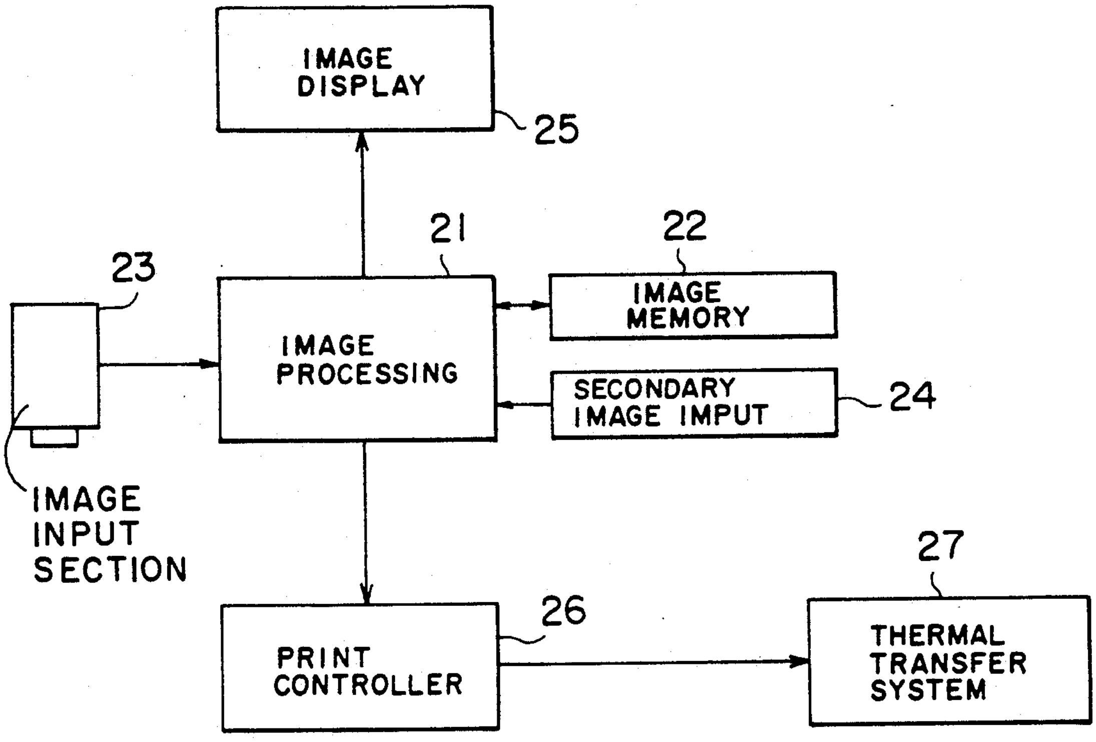
FIG. 3 is a drawing which shows the outline of the image forming apparatus of a photographic print.
Figure 4:
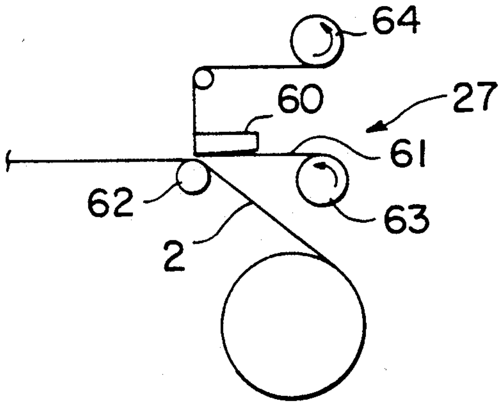
FIG. 4 is a drawing which shows the outline of the thermal-transfer image forming portion of the image forming apparatus of a photographic print.

FIG. 3 is a schematic illustration of the image forming apparatus of a photographic print, and FIG. 4 is a schematic illustration of a thermal-transfer image forming section of the image forming apparatus of a photographic print.

In FIG. 3, numeral 21 is an image processing section, and this image processing section 21 is connected with an image memory 22, an image input section 23, a secondary image input section 24 and an image display section 25.

A conventional computer having an image processing capacity can be used as the image processing section 21. A memory unit which can directly transmit information to the computer such as an optical disk, a CD-ROM, a floppy disk, and an IC card, can be used as the image memory 22. The information stored in the image memory 22 may be inputted with a key board of the secondary image input section 24, a mouse, a scanner and the like each time except for the information which is repeatedly used.

A scanner, a video camera and the like which can input a graphic image may be used as the image input section 23. For example, the secondary image input section 24 is composed of a key board, a mouse, a scanner or the like, and the image display section 25 is composed of a display.

The image information which is inputted from the image input section 23, and secondary image information which is inputted from the secondary image input section 24 and which is added onto the photographic print 1 can be previously stored in the image memory 22.

As illustrated in FIG. 1, the photographic print 1 is composed of a primary image portion 1*a* and a non-image portion 1*b*. A secondary image 1*c* is added onto the aforementioned portions 1*a*, 1*b* in such a manner that a previously formed image is read by the image input section 23 from a photographic paper or a negative film, and the image information is inputted into the image processing section 21. In the image processing section 21, image processing is conducted while the layout such as a printing position of the secondary image 1*c* and a print size is displayed on the image display section 25. In the way described above, the layout of the secondary image can be previously checked on the image display 25, so that a mistake can be easily corrected.

The secondary image information which has been made or edited by the image processing section 21, is sent to the thermal-transfer system 27 by the control of the print controller 26 so that the secondary image can be thermal-transferred onto the primary image portion and/or the non-image portion of the photographic paper 2.

Concerning character information, the image processing section 21 or the thermal-transfer system 27 may be previously provided with character font information, and the information may be called when thermal-transfer is conducted.

The thermal-transfer system 27 is composed as shown in FIG. 4. For example, the thermal-transfer system 27 is composed of a thermal print-head 60 and a ink ribbon 61. The ink is thermally transferred onto the photographic paper 2 which is conveyed by a conveyance roller 62 so that the secondary image can be formed on the primary image portion and/or the non-image portion. The ribbon 61 is conveyed from a ribbon supply section 63 to a ribbon winding section 64.

Concerning the thermal-transfer cond by the thermal-transfer system 27, there are two types of thermal-transfer. One is a fusion type thermal-transfer and the other is a sublimation type thermal-transfer. It is preferable to adopt the fusion type thermal-transfer from the viewpoint of clear printing. A thermal head is commonly used for the thermal-transfer system 27. From the viewpoint of printing quality, a head, the dot density of which is not less than 8 dot/mm, is preferable.

Concerning the thermal-transfer printing method, there are two types. One is a parallel system and the other is a serial system. From the viewpoint of printing speed, the parallel system is preferable. However, the printing system is not limited to the parallel system because the serial system is advantageous in that the printing dot density can be easily increased.

As explained above, in the method of the present invention, the primary image is previously printed on the photographic paper and, the secondary image is formed on the primary image portion and/or the non-image portion on the photographic paper by the method of thermal-transfer. Consequently, when the secondary image is added onto the photographic print, it is not necessary to make a film on which the secondary image information is recorded. Further, the secondary image information of high printing quality can be added without damaging the image on the photographic paper.

The aforementioned thermal-transfer printing may be conducted in a photofinishing laboratory after the photographic paper has been made, or it may be conducted in a store at a user's request.

The thermal-transfer printing may be conducted in the laboratory in such a manner that a thermal-transfer printer is directly connected with an automatic photographic processor so that the thermal-transfer printing can be conducted simultaneously in the course of automated processing.

When a post card is made, a customer will write down the required information (such as characters, illustrations and blank portions) on a layout card at a shop.

Then, a negative film to be used and the aforementioned layout card are sent to a photofinishing laboratory. In accordance with the layout card, a photographic print is made by a conventional printing process, wherein in some cases trimming is conducted and in some cases a plurality of prints are made. Character information and illustration information written on the layout card are inputted into a computer through a key board, mouse, scanner, video camera and the like.

After processing, the photographic print is set in the thermal-transfer printer, and the information is sent to the thermal-transfer printer from the computer so that the necessary information can be printed on the photographic print.

The photographic print made in the manner described above is sorted and sent back to the customer through a camera shop.

The photographic print 1 of the present invention is made in such a manner as described above. Further, a UV-curable resin coat layer can be formed on all the images on the photographic print.

Figure 5:
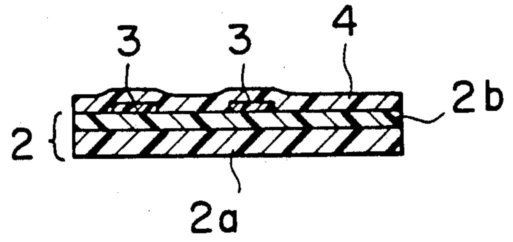
FIG. 5 is a sectional view of a photographic print.

As shown in FIG. 5, the photographic print 1 comprises: the photographic image layer 2*b* which is provided on the support 2*a* of the photographic paper 2, wherein an image is carried in the photographic element 2*b;* the thermal-transfer image layer 3 which is provided in a predetermined position on the photographic element 2*b;* and the UV-curable resin coating layer 4 which is provided on the photographic image layer 2*b* and the thermal-transfer image layer 3.

The secondary image is formed on the primary image portion and/or the non-image portion of the photographic print in the same manner as described above, so that the detailed explanation will be omitted, and only the formation of the UV-curable resin coating layer 4 will be explained referring to FIG. 6.

Figure 6:
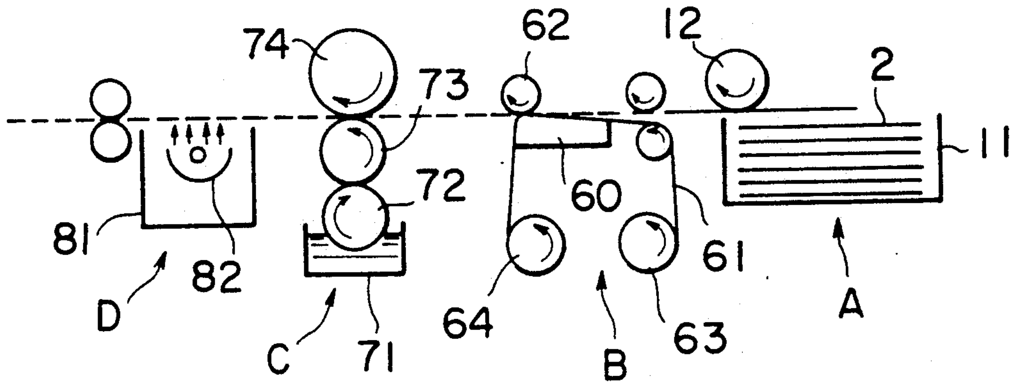
FIG. 6 is a schematic illustration of an image forming apparatus of a photographic print.

FIG. 6 is a schematic illustration of an image forming apparatus of a photographic print.

The image forming apparatus of a photographic print is provided with supply section A, thermal-transfer section B, coating section C and UV-ray illuminating section D, and a card-shaped photographic paper 2 is conveyed by the aforementioned sections in order. Supply section A is provided with a photographic paper case 11 in which the photographic paper 2 is stored.

The photographic paper case 11 is provided with a plurality of photographic papers in which an photographic image is formed in such a manner that: the image is printed on the silver halide light sensitive component of the photographic paper; and the image is developed. These photographic papers are conveyed to thermal-transfer section B by the rotating supply roller 12 one sheet by one sheet. The photographic image layer of the photographic paper includes all the layers formed on the support on the silver halide light sensitive component side of the photographic paper, for example the under-coat layer, emulsion layer, intermediate layer and protective layer are included in the silver halide light sensitive component.

In thermal-transfer section B, the secondary image of a character and figure is formed on a predetermined position of or the non-image portion of the photographic by the method of thermal-transfer.

As illustrated in FIG. 6, thermal-transfer section B is composed of a thermal-transfer head 60 and a thermal ink transfer ribbon 61. By the thermal-transfer head 60, ink of the ribbon 61 is thermally transferred onto the photographic paper 2 which is conveyed by the feed roller 62 so that the heat-transferred image layer 3 is laminated. In the aforementioned way, the secondary image is formed on the primary image portion of the non-image portion on the photographic print. The ribbon 1 is conveyed from the ribbon supply section 63 to the ribbon winding section 64.

The photographic paper 2 is supplied from thermal-transfer section B to coating section C. In coating section C, all the images of the primary image of the photographic image layer and the secondary image are coated with UV-curable resin. In coating section C, the UV-curable resin is stored in a tank 71. The UV-curable resin is supplied from the tank 71 to a gravure roller 73 through a pick-up roller 72. When the photographic paper 1 passes through between the gravure roller 73 and a back roller 74, the UV-curable resin is coated all over the surface of the image portion on the photographic paper 2.

Further, the photographic paper 2 is conveyed from coating section C to UV-ray illuminating section D. In UV-ray illuminating section D, a UV lamp 82 is installed inside a protective hood 81, and the UV-hardening resin coated on the photographic paper 2 is illuminated with UV-rays emitted from the UV lamp 82. In the manner described above, a resin coating layer which has been hardened by UV-rays is laminated on all the images on the photographic paper 2. The primary image and the secondary image which has been added separately are protected by the resin coating layer.

The size of the photographic print 1 is not limited to a specific size. For example, an A4 size, a post card size, a service size and the like can be used.

Figure 7:
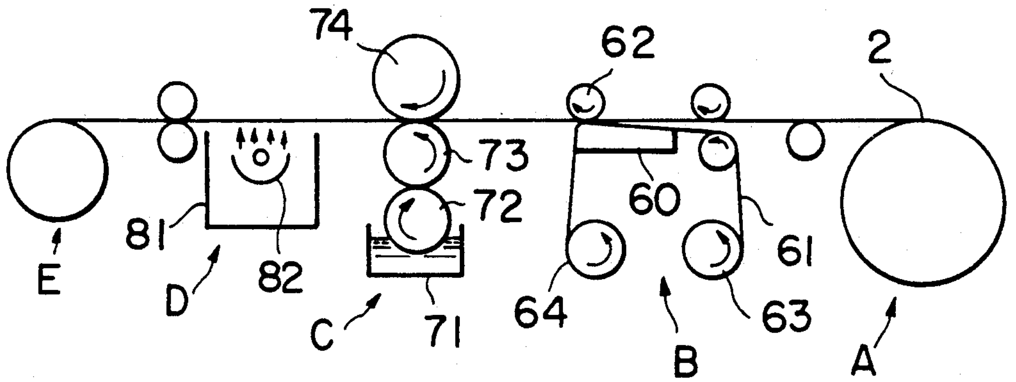
FIG. 7 is a schematic illustration of another embodiment of an image forming apparatus of a photographic print.

FIG. 7 is a schematic illustration of an image forming apparatus of another embodiment. In this embodiment, a photographic paper 2' in roll is set to supply section A. This photographic paper 2' is conveyed from supply section A to thermal-transfer section B, coating section C and UV illuminating section D in sequence, and the photographic print which has been processed by the aforementioned processing sections and has a durable photographic image, is wound into holding section E.

Figure 8:
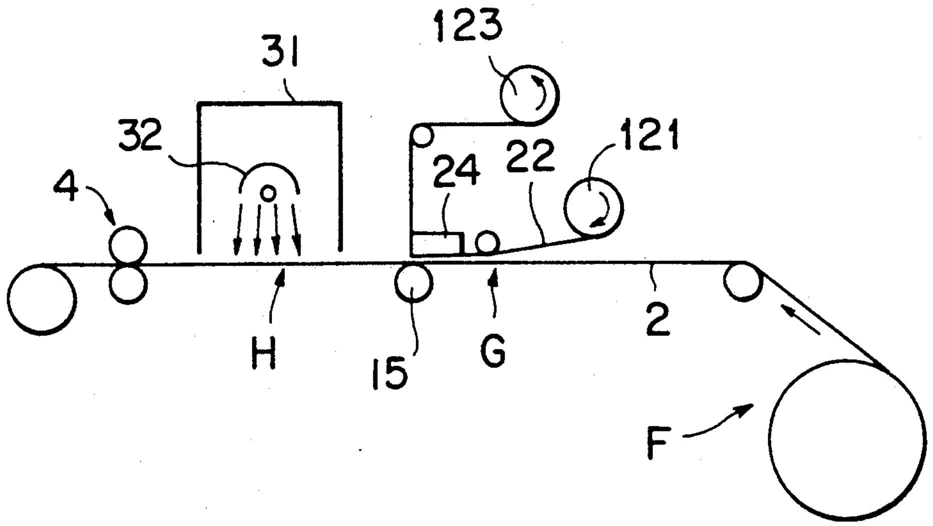
FIG. 8 is a schematic illustration of a resin coating apparatus.
Figure 9:
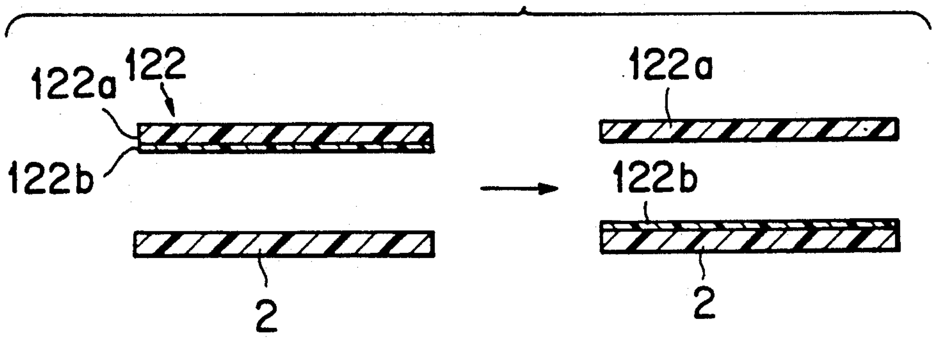
FIG. 9 is a drawing which shows the thermal-transfer of a UV-curable resin layer.
Figure 10:
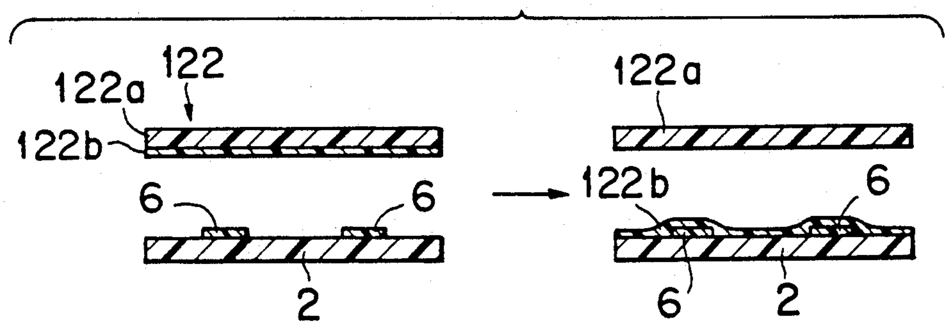
FIG. 10 is a drawing which shows another embodiment of the thermal-transfer of UV-curable resin layer.

Another embodiment of a resin coat forming method is illustrated in FIG. 8 to FIG. 10.

In FIG. 8, the resin coat forming apparatus is provided with the photographic paper supply section F, the thermal-transfer section G, and the hardening section H. Photographic paper 2 is set to the photogrpahic paper supply section E, and is conveyed by the conveyance roler 4 to the thermal-transfer section G and the hardening section H in sequence. This photogrpahic paper 2 is guided by the platen roller 15.

In the thermal-transfer section G, a thermal ink transfer ribbon 122 is set to a ribbon supply section 121. This thermal-transfer ribbon 122 is wound by a winding section 123. As shown in FIG. 8, the thermal-transfer ribbon 122 is formed in such a manner that a UV-curable resin layer 122*b* is coated on a support 122*a*. A thermal-transfer head 124 is placed in such a manner that it is opposed to the platen roller 15. The thermal-transfer ribbon 122 is heated by the thermal-transfer head 124 so that the UV-curable resin layer 122*b* formed on the support 122*a* is transferred onto photogrpahic paper 2.

Consequently, only the support 122*a* of the thermal-transfer ribbon 122 is wound by the ribbon winding section 123, and the UV-hardening resin layer 122*b* which has been transferred onto photographic paper 2 is conveyed to the hardening section H.

The thermal-transfer head 124 can be replaced with a heat-roller. However, when the thermal-transfer head 124 is utilized, it is advantageous in that only a necessary portion can be coated with a resin coating layer since heating can be turned on and off in the case of the thermal-transfer head 124.

In the hardening section H, UV-rays are emitted from a UV-lamp 32 installed in a protective hood 31 on the UV-curable resin layer 122*b* so that the UV-curable layer 122*b* can be hardened to form a resin coat layer.

In the manner described above, the thermal-transfer ribbon 122 is utilized in order to form a resin coating layer on photographic paper 2, wherein the, UV-curable resin layer 122*b* is previously formed on the support 122*a* of the thermal-transfer ribbon 122. Accordingly, a uniform resin coating layer can be formed simply.

FIG. 10 shows another embodiment. As shown in FIG. 10, an image 6 is formed on photographic paper 2. In this case, heat is given to a UV-curable resin layer 122*b* of a thermal-transfer ribbon 122 so that a UV-curable resin layer 122*b* can be transferred onto photographic paper T in which the image 6 has been formed. After that, the transferred UV-curable resin layer 122*b* is illuminated with UV-rays so that it can be hardened.

Figure 11:
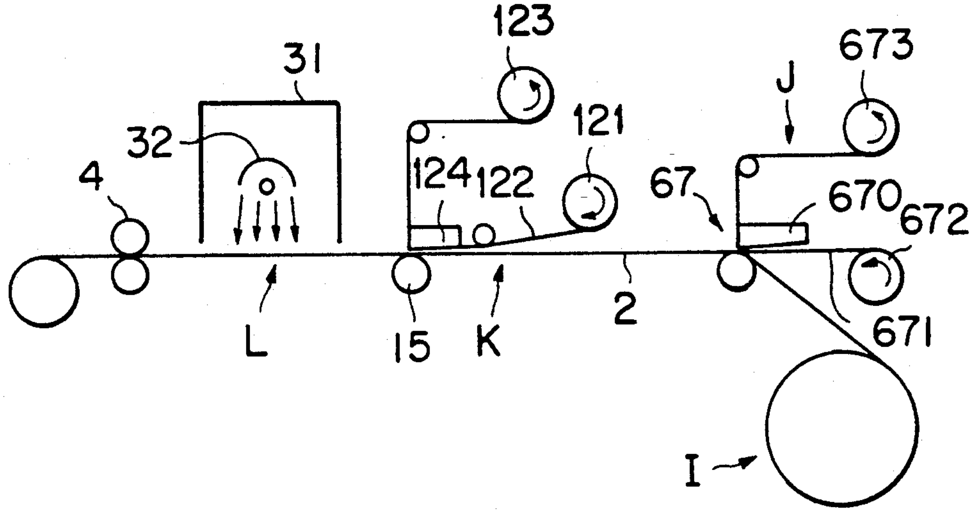
FIG. 11 is a schematic illustration of an image forming apparatus of a photographic print.

As shown in FIG. 11, an image forming apparatus for a photographic print is provided with a photographic print supply section I, a secondary image forming section J, a thermal-transfer section K, and a hardening section L.

Photographic paper 2 which has been previously made is set to the photographic print supply section H. This photographic paper 2 is conveyed by a conveyance roller 4 to the image forming section J, the thermal-transfer section K, and the hardening section L.

As shown in FIG. 3, secondary image forming section J is connected with the image processing section 21, the image memory 22, the image input section 23, the secondary image input section 24, and the image display section 25.

The secondary image information which has been made or edited in the image processing section 21, is sent to the thermal-transfer system 27 by controlling the print controller 26, and as illustrated in FIG. 1, the secondary image is thermal-transferred onto the image portion or non-image portion on photographic paper 2.

As illustrated in FIG. 11, a thermal-transfer system 67 thermally transfers a thermal-transfer ribbon 671 onto photographic paper 2 with a thermal-transfer head 670 so that the secondary image can be formed on the image or non-image portions of photographic paper 2. The thermal-transfer ribbon 671 is conveyed from a ribbon supply section 672 to a ribbon winding section 673.

In the thermal-transfer section K heat is given to the UV-curable resin layer of the thermal-transfer ribbon 122 so that the resin layer can be transferred onto all the images of photographic paper or onto the images to be protected. In the hardening section L the transferred UV-curable resin layer is illuminated with UV-rays so that a hardened resin layer can be formed. These thermal-transfer section K and hardening section L are composed in the same manner as described before, so that the explanation will be omitted.

In this embodiment, a photographic paper in roll is used. However, it is possible to use a photographic paper in sheet, and further the print size is not limited to a specific size. For example, an A4 size, a post card size, a service size and the like can be used.

What is claimed is:

1. An apparatus for forming a secondary image on a photographic print paper wherein a primary image has been developed, the apparatus comprising:

editing means for determining a secondary image position to be formed on the developed photographic paper;

means of inputting the secondary image to the editing means; and transfer means for transferring the secondary image from a thermal ink transfer ribbon onto the developed photographic paper by a thermal print-head according to the determination of the editing means.

2. The apparatus of claim 1, further comprising:

means for inputting the primary image to the editing means.

3. The apparatus of claim 1, further comprising:

an image memory for storing the secondary image.

4. The apparatus of claim 1, further comprising:

image display means for displaying the inputted image.

5. The apparatus of claim 1, further comprising:

means for coating UV-curable resin on the photographic paper, and means for illuminating the coated UV-curable resin with UV-rays to harden the resin.

6. The apparatus of claim 1, further comprising:

means or transferring UV-curable resin layer onto the photographic paper; and means for illuminating the transferred UV-curable resin layer with UV-rays to harden the resin.

7. In a system including an editing means, a thermal ink transfer ribbon, and a thermal print head, a method of forming a secondary image on an exposed photographic paper comprising the steps of:

developing a primary image on the photographic paper;

inputting the primary image and the secondary image to the editing means;

determining a secondary image position on the developed photogrpahic paper; and transferring the secondary time from the thermal ink transfer ribbon onto the developed photogrpahic paper by the thermal print-head according to the determination.

8. The method of claim 7, further comprising the steps of:

coating UV-durable resin on the photographic paper; and illuminating the coated UV-curable resin with UV-rays to harden the resin.

9. The method of claim 7, further comprising the steps of:

transferring UV-curable resin layer onto the photogrpahic paper; and illuminating the transferred UV-curable resin layer with UV-rays so as to harden the resin.

* * * * *